United States Patent Office 2,821,114
Patented Jan. 28, 1958

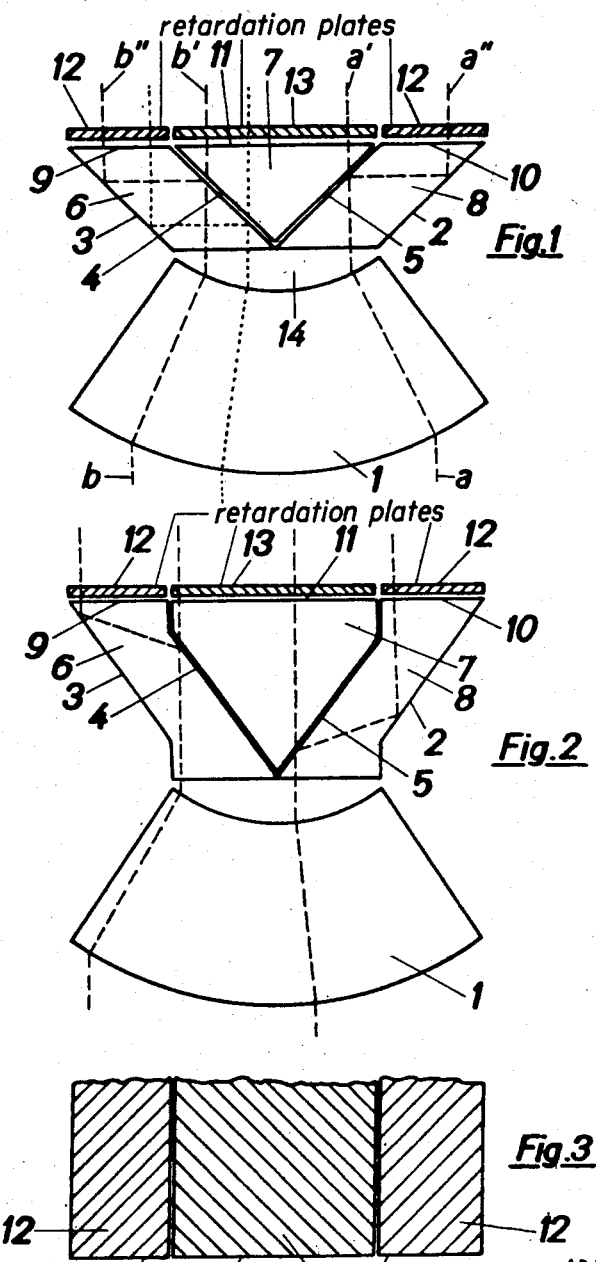

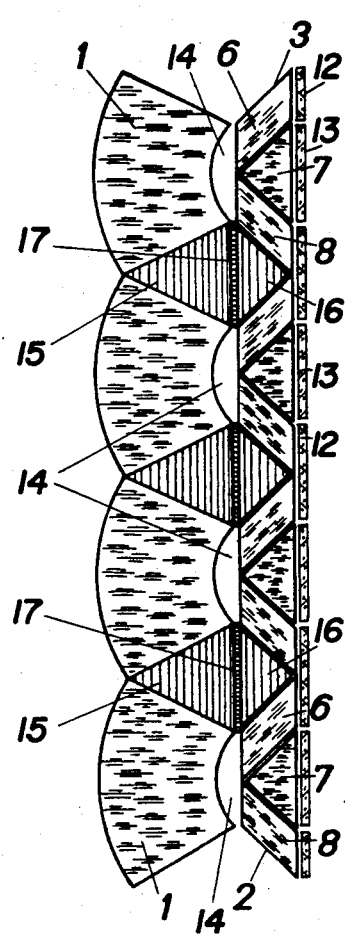
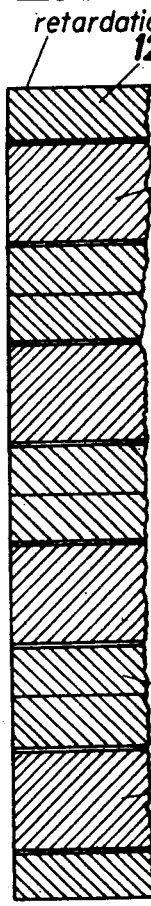
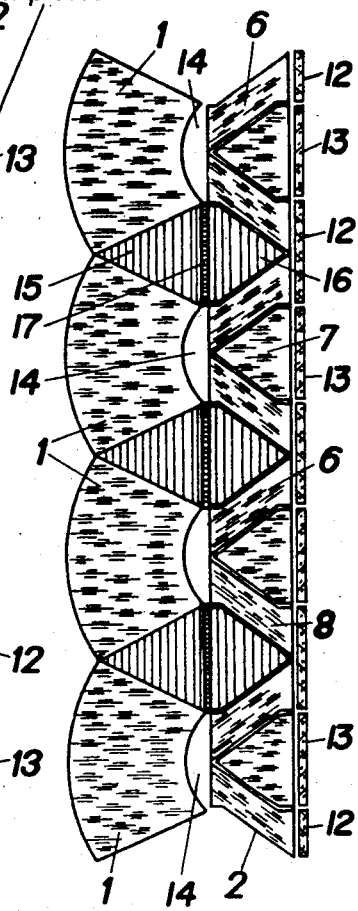

2,821,114

SYMMETRICAL INTERFERENCE POLARIZERS

Kürt Wiemer, Bad Tolz, and Paul Edward Wiemer, Rottach-Egern, Germany, assignors to Pola-Lux Gesellschaft fur Blendschutz and Raumbildprojektion mit beschrankter Haftung, Dusseldorf, Germany, a corporation of Germany Application April 1, 1953, Serial No. 346,112

Claims priority, application Germany April 16, 1952

5 Claims. (Cl. 88—65)

This invention relates to symmetrical interference polarizers.

All hitherto known interference polarizers, which operate without loss of light, exhibit disturbing defects owing to the fact that as a fundamental feature, by splitting of the rays, the light-incidence surface has a ratio of 1:2 with respect to the light-emission surface and there is thus produced a lateral displacement and enlargement of the beam of rays. Furthermore, it is necessary that the incident light be made parallel for effecting a high degree of polarization.

The method of constriction of the cross-section of the beam of rays by a cylindrical lens system which is positioned in front of the interference polarizers has already been described. In this way, the incident beam of light rays is first of all narrowed down to the necessary half surface. However, the asymmetrical lateral displacement of the emergent beam of rays, which displacement is particularly disturbing in the case of stereoscopic projection, is not avoided in this manner.

By the arrangement according to the present invention which is hereinafter described, the asymmetrical arrangement of the system is avoided and a completely symmetrical ray path is achieved. Since the interference polarizers described can be made very small and only consist of two different structural elements, which may preferably be made of glass, but may also be made of plastic, by moulding or grinding, it is possible to produce plates of any desired size by assembling such structural elements, which plates operate practically without loss of light and polarize both rays uniformly at angles of incidence which may be 45° or even greater than 45°.

A further disadvantage which is presented by known interference polarizers is that to quite a particular degree, the deviated ray exhibits a strong spectral colouring of the emergent polarized light. It has already been proposed to use rotating polarizers for eliminating this disadvantage. However, when the interference polarizers are of asymmetrical construction, the rotation thereof is associated with various disadvantages. These disadvantages are obviated by the symmetrical interference polarizers hereinafter described and the structure of rotating discs is substantially simplified; above all, the disc-type interference polarizers hereinafter described do not require any additional optical or mechanical aids in the rotation.

These disc-like, rotating, symmetrical interference polarizers for stereoscopic projectors only permit of projection with circularly polarized light. They can either be so constructed that they emit a uniformly circularly polarized light, in which case they can only be used for two-strip systems with two separate discs and two separate objectives, or they can also be of subdivided construction, in which case they are particularly suitable for single-strip projection with field-splitting. In this case, however, especially when the rotating discs are arranged at a relatively large distance from the projector gate, it is possible that the disadvantage may arise which consists in that the dividing line on the rotating disc which separates the right-handed circularly polarized set of rays from the left-handed circularly polarized set, does not remain sufficiently sharp and the differently circularly polarized sets of rays merge into one another and thus can no longer be kept separate in the images with sufficient sharpness.

According to the invention, this defect is eliminating owing to the fact that an opaque partition is fitted between the two polarizers, which partition is arranged in the path of the rays and parallel thereto. This partition can be arranged at the projector gate, inside the barrel diaphragm, at the rotating disc itself or at several of the said places simultaneously. Instead of the rotating discs, it is also possible to provide a single polarization assembly, preferably as close as technically possible to the projector gate. It is obvious that this assembly must also be provided with quarter wave retardation plates ($\lambda/4$ plates) and emit circularly polarized light and it is advantageous that it also should be adapted to rotate, in which case the optical axis of the whole system and the axis of rotation coincide.

A further advantage of the compound disc-shaped symmetrical interference polarizers of this invention consists in that the construction of these discs is more simple and less expensive than with disc-shaped asymmetrical polarizers of the construction hitherto known. The number of lens systems and also the number of $\lambda/4$ plates is about half as large as with asymmetrical polarizers, and nevertheless only two different constructional elements are necessary, which is particularly favourable from the point of view of the cost of manufacture.

A parallel direction of the linear polarization planes which are disposed at right angles to one another from element to element, is not necessary, since only uniformly circularly polarized light is used. However, this is achieved by the fact that the $\lambda/4$ plates are alternately arranged at an angle of 45° to the polarization plane and at right angles to one another, which again represents a substantial simplification in production.

These and other objects of the invention, as well as the advantages of it, will be apparent from this description, the claims, and the accompanying drawings in which:

Fig. 1 is a plain view of an interference polarizer according to this disclosure with the polarizing layers arranged at an angle of 45° to the optical axis of the device;

Fig. 2 is a plain view of a modified view of the invention in which the polarized layers are arranged at an angle of 55° to the optical axis of the device;

Fig. 3 is a front view of a section of an interference polarizer as shown in Fig. 1;

Fig. 4 is a plain view illustrating a plurality of interference polarizers, such as are shown in Fig. 1 arranged side by side;

Fig. 5 shows a similar plain view of a plurality of interference polarizers, such as are shown in Fig. 2 arranged side by side; and Fig. 6 is a front view of a series of interference polarizers which are arranged side by side as pictured in Fig. 4. In all of the figures in the drawings, like numerals designate like parts.

Referring now specifically to Figure 1 of the drawings, it is seen that the new interference polarizer of the present invention consists essentially of cylindrical lens *l* capable of reducing the area covered by the incident light falling upon the device by a factor of approximately ½. This light, in addition to being reduced in area, is rendered parallel by the lens *l*, from which it passes through an air space 14 and into either one of the two symmetrical parallelepipeds 6 or 8. Between them a glass prism 7 is positioned in which two polarizing layers 4 and 5 are symmetrically arranged at an angle of 45° with respect to the direction of incident light for the purpose that will presently be shown. All of the exit surfaces 9, 10 and 11 of the parallelepipeds 6 and 8 and the prism 7 are covered by quarter wave plates 12 and 13 so as to circularly polarize the emitted light.

During the operation of the device, a beam of light "*a*" entering the cylindrical lens *l* travels through this lens in the manner indicated, and thence, across the air gap 14 into the glass parallelepiped 8. Upon striking the surface 5, it is split up into two beams *a'* and *a''* in a manner known to the art. The beam *a'* projects directly through the interface 5 and then out directly through the prism 7 and the quarter wave plate 13. The beam *a''* on the other hand is reflected by the interface 5 against the surface 2 and thence is further reflected out through the exit surface 10 and the quarter wave plate 12. A similar beam entering the cylindrical lens *l* passes through the air gap 14 into the parallelepiped 6 against the interface 4 where it also is broken up into two light beams *b'* and *b''*. The beam *b'* travels through the interface 4 and the prism 7 and then out through the exit surface 11 and the quarter wave plate 13. The beam *b''* is reflected to the surface 3 and thence out through the exit surface 9 and the quarter wave plate 12. Other entrance beams of light hitting the cylindrical lens *l* are treated in a similar manner.

The modification of the device shown in Figure 2 is quite similar to the construction of Figure 1 except that the interference polarizers have an angle of incidence of 55° whereas the interference polarizer of Figure 1 has an angle of incidence of 45°. The operation of this device is obviously substantially the same as the operation of the device shown in Figure 1 and inasmuch as the numerals of both constructions are the same for like parts, it is not considered necessary to describe it in detail.

In both the construction of Figure 1 and the construction of Figure 2, the quarter wave plates 12 and 13 are placed with their optical axis at an angle of 45° to the plane of polarization of the light beams coming from the prisms and parallelepipeds 6, 7, and 8. The quarter wave plates in both constructions which are positioned so as to have their optical axes of the quarter wave plates 12 and 13 are positioned with respect to one another as is shown in Figure 6 whereby the oblique lines within the elements 12 and 13 indicate the orientation of the optical axis of the quarter wave plates 12 and 13.

The individual members according to Figures 1 and 2, can be arranged to form relatively large unitary plates such as shown in Figs. 4 and 5 and in the front elevation of Figure 6. These large-area plates are composed of numerous rodlike elements corresponding to Figs. 1 and 2. These rod-like elements are combined with one another by prismatic bodies 15 and 16 and plates 17 which do not have any optical function and may consist of opaque material.

All the polarizers which have been described can either remain stationary or rotate. The polarizing discs shown in Figs. 4, 5, and 6 are also suitable for application in the known manner as headlamp masking discs for anti-dazzle purposes and as fog-lamps.

What is claimed is:
1. A polarizing device comprising lens means for condensing the light rays entering said device to a fraction of their initial cross section and for directing them as parallel beams, a pair of parallelepiped prism elements positioned behind said lens means and being arranged to diverge from said lens means symmetrically about the optical axis of said lens, an angular prism element also arranged symmetrically with respect to the optical axis of said lens means and being included within the space between said pair of parallelepiped prism elements, interference polarizing layer means disposed between the adjacent surfaces of said pair of parallelepiped prism elements and said angular prism element, the surfaces of each of said parallelepiped prism elements opposite said surfaces adjacent said polarizing layer means forming reflecting means for directing the reflected polarized light beams parallel to the transmitted polarized light beams, and the combined areas of the exit surfaces of said prism elements being substantially equal to the entrance area of said lens means to provide emergent polarized light substantially unaltered in cross section with respect to said light rays entering said device.

2. A polarizing device as set forth in claim 1 wherein light retardation plate means is positioned in the path of said emergent reflected and transmitted polarized light beams for circularly polarizing all of said light emergent from said polarizing device.

3. A polarizing device as claimed in claim 2 in which the said side surface of said angular prism and the said base surfaces of said parallelepipeds which form the light exit surfaces of said device are alternately so covered with quarter wave plates that their optical axes are at an angle of 45° to the polarization planes of the light emergent said exit surface and simultaneously at right angles to one another so as to produce uniformly, circularly polarized light.

4. A polarizing device as claimed in claim 1, in which the construction is such that the angles of incidence of the light at the symmetrically arranged polarizing layers are greater than 45°.

5. An interference polarizer assembly comprising a parallel laterally extending assembly of polarizing devices as claimed in claim 2, the exit surfaces of abutting parallelepiped prisms belonging to different individual polarizing devices being covered by the same quarter wave plate.

References Cited in the file of this patent

UNITED STATES PATENTS

| | | |
|---|---|---|
| 1,328,293 | Parker | Jan. 20, 1920 |
| 2,118,160 | Cawley | May 24, 1938 |
| 2,402,176 | Marks | June 18, 1946 |
| 2,437,061 | Wright | Mar. 2, 1948 |
| 2,449,287 | Flood | Sept. 14, 1948 |
| 2,476,014 | Wright | July 12, 1949 |

FOREIGN PATENTS

| | | |
|---|---|---|
| 460,666 | Great Britain | Jan. 28, 1937 |
| 933,540 | France | Jan. 1, 1946 |

UNITED STATES PATENT OFFICE
CERTIFICATE OF CORRECTION

Patent No. 2,821,114                                             January 28, 1958

Kurt Wiemer et al.

It is hereby certified that error appears in the printed specification of the above numbered patent requiring correction and that the said Letters Patent should read as corrected below.

Column 2, line 7, for "eliminating" read -- eliminated --; line 48, for "modified view" read -- modified form --; line 65 and every occurrence thereafter, the reference character for "cylindrical lens" should be numeral -- 1 -- (one) instead of "1" (L) in italics; column 3, line 43, strike out "which"; line 45, strike out "are"; column 4, line 8, for "lens," read -- lens means, --; line 30, for "the said side" read -- the side --; at the end of the same line, after "the" strike out "said".

Signed and sealed this 5th day of August 1958.

(SEAL)
Attest:
KARL H. AXLINE                                                                ROBERT C. WATSON Attesting Officer                                                             Commissioner of Patents